United States Patent [19]
Whitright et al.

[11] Patent Number: 5,504,477
[45] Date of Patent: Apr. 2, 1996

[54] TRACKING SYSTEM

[75] Inventors: Kenyon C. Whitright, Colorado Springs; Donald J. Newman, Guffey; Kenneth R. Fasen, Colorado Springs, all of Colo.

[73] Assignee: Wybron, Inc., Colorado Springs, Colo.

[21] Appl. No.: 153,122

[22] Filed: Nov. 15, 1993

[51] Int. Cl.⁶ .................................................. G01S 3/72
[52] U.S. Cl. .................... 340/825.5; 340/825.49; 367/2; 367/6; 367/117; 367/120; 342/61
[58] Field of Search ................ 340/825.54, 825, 340/49, 825.36; 367/2, 6, 95–97, 117, 118, 120, 124, 127, 129; 342/61, 66; 315/312, 317–319, 324; 348/169

[56] References Cited

U.S. PATENT DOCUMENTS

| | | | |
|---|---|---|---|
| 4,067,015 | 1/1978 | Moyavero et al. | 348/169 |
| 4,264,928 | 4/1981 | Schaber | 348/169 |
| 4,799,059 | 1/1989 | Grindchl et al. | 340/825.54 |
| 4,905,315 | 2/1990 | Solari et al. | 318/640 |
| 4,980,871 | 12/1990 | Sieber et al. | 367/127 |
| 5,107,746 | 4/1992 | Bauer . | |
| 5,150,310 | 9/1992 | Greenspun et al. | 364/452 |
| 5,179,421 | 1/1993 | Parker et al. | 348/169 |
| 5,214,615 | 5/1993 | Bauer . | |
| 5,412,619 | 5/1995 | Bauer . | |

FOREIGN PATENT DOCUMENTS

WO8604476  7/1986  WIPO .

*Primary Examiner*—Michael Horabik
*Attorney, Agent, or Firm*—Holland & Hart

[57] ABSTRACT

A performer tracking system, and an associated method, for tracking movements of at least one performer upon a stage. A plurality of signal transmitters are positioned about the stage and transmit electromagnetic signals. Performers on the stage carry transponders which receive the electromagnetic signals and, responsive thereto, generate coded sound signals. Sound signal receivers positioned together with the signal transmitters receive the sound signals. A controller determines positions of the transponders and, hence, the performers carrying the transponders and causes spotlights to track the performers.

25 Claims, 8 Drawing Sheets

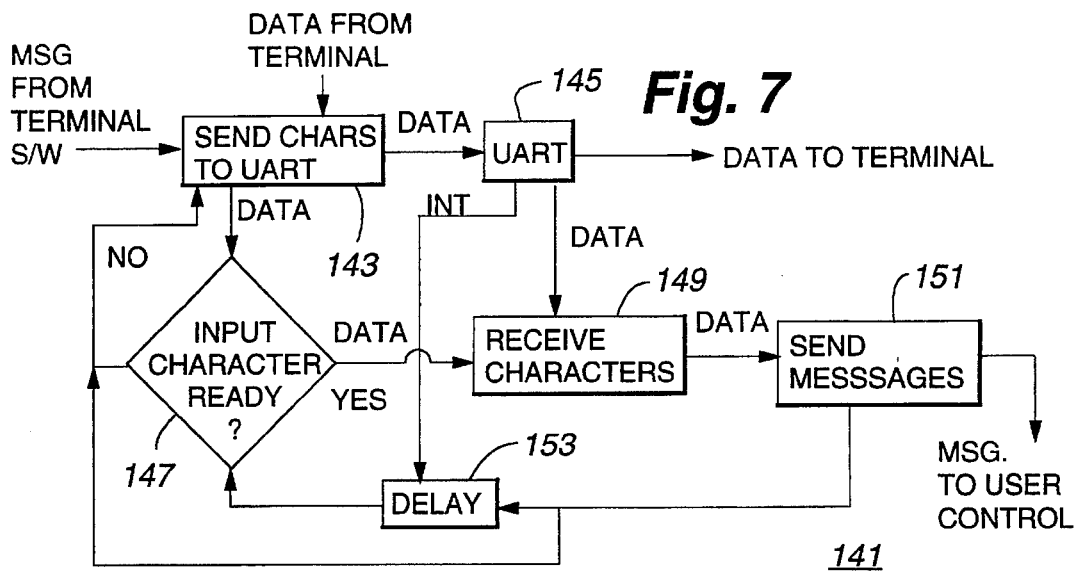
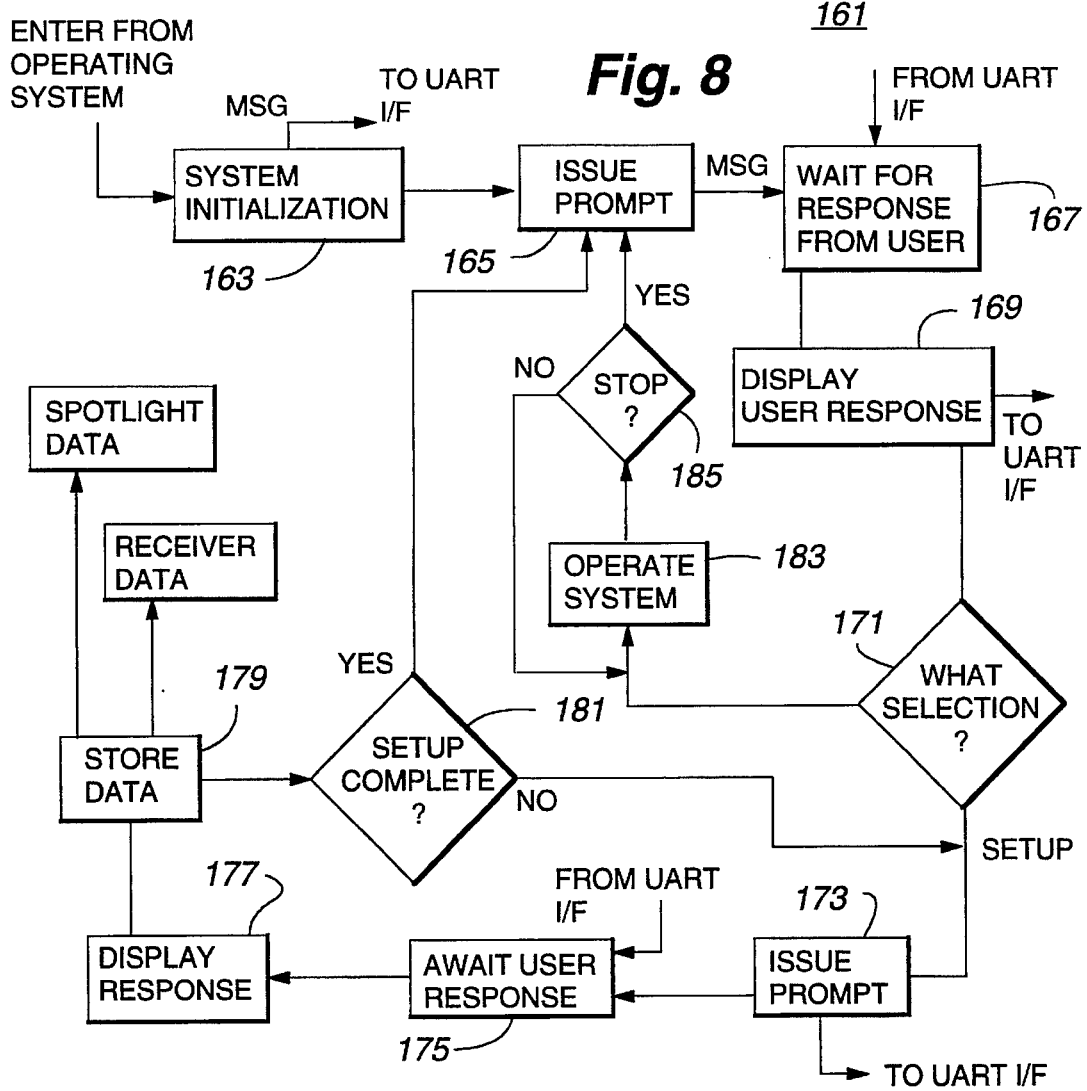

TRACKING SYSTEM

BACKGROUND OF THE INVENTION

The present invention relates to tracking systems. More particularly, the invention comprises a system and method for tracking a plurality of persons or objects with a plurality of spotlights.

In the entertainment industry, a very frequent requirement is for one or more spotlights to track one or more persons or objects moving about a stage. In addition, the characteristics of the spotlights (focus, color, intensity, shape, etc.) must be changed quite frequently during the course of a performance of a show. In the past, the foregoing functions were performed by skilled workers. That practice required considerable time for rehearsal of the lighting workers, was prone to human error, and involved significant salary expense. These problems are compounded for a show that is "on the road." A show's management has two choices with regard to lighting workers: (1) hire workers to travel with the show, which involves considerable salary, travel, lodging, and meal expense; or (2) hire local workers, which requires that new workers be rehearsed in each location and results in a generally high rate of error.

Relatively recently, lighting control consoles have become quite common. Such consoles allow centralized control over the characteristics of a show's spotlights. However, prior to the present invention, no accurate, cost-effective system for aiming the spotlights at persons or objects moving on a stage had been developed.

U.S. Pat. No. 4,067,015 (Mogavero et al.) discloses a system in which each individual or object to be tracked is provided with a radio frequency or ultrasonic transmitter. An array of receivers receives the transmitter's signal. An appropriately-programmed computer determines the location of the transmitter using the phase difference between the signals received by different receivers. A servomechanism then acts to direct the beam of a spotlight at the person or object to which the transmitter is attached.

In U.S. Pat. No. 4,264,928 (Schober), adjacent microphones receive the sound waves from a person speaking. The time difference between the arrival of the sound waves at the microphones is used to position a beam of light on the speaker.

U.S. Pat. No. 4,905,315 (Solari et al.) describes a system in which a number of sensors on a rotatable platform are disposed at angularly spaced intervals on a vertical plane and on a horizontal plane. A control signal radiated by an infrared light transmitter is attached to a moving object. The beam width of the transmitter's signal is such that it is normally received at only one or two of the sensors. A control system acts to rotate the platform horizontally and vertically so that the transmitter's signal is received by detectors immediately adjacent to the line formed by the intersection of the horizontal and vertical planes, thereby aiming a device mounted on the platform at the transmitter.

U.S. Pat. No. 4,980,871 (Sieber et al.) discloses an ultrasonic tracking system in which an ultrasonic transmitter is attached to the person or object to be tracked. The transmitter periodically transmits brief ultrasonic bursts. An array of three microphones is attached to a drive unit capable of panning and tilting. A control system compares the times of arrival of signals at the microphones, then pans and tilts the drive unit until the signals arrive at the microphones simultaneously, which occurs only when an aiming line of the drive unit is pointed directly at the transmitter.

U.S. Pat. No. 5,150,310 (Greenspun et al.) discloses a method and apparatus for position detection in which a transmitter attached to a person or object to be tracked periodically emits a burst of pulsed energy. The spatial position of the transmitter is determined by calculations based on the differences in the arrival times of the transmitter's signal at a plurality of receivers that are disposed at known locations.

U.S. Pat. No. 5,179,421 (Parker et al.) discloses a system in which an infrared transmitter is attached to a person or object to be tracked. A rotating set of blinders varies the view angle of a receiver disposed on a base unit. The receiver detects when the peak received signal occurs and uses that data to determine the angle between the aiming axis of the base unit and a line from the base unit to the transmitter. A servomechanism pans and tilts the base unit so as to decrease the angle to zero, thereby pointing the base unit's aiming axis at the transmitter.

SUMMARY OF THE INVENTION

At least three receivers are disposed about the area in which a person or object is to be tracked by one or more spotlights. Upon receipt of a periodic signal from a controller (the "heartbeat signal"), each receiver amplifies the signal and drives an infrared ("IR") source, which transmits an IR heartbeat signal. When an IR sensor included in a transponder that is attached to the person or object to be tracked receives an IR heartbeat signal, an ultrasonic transmitter included in the transponder transmits a series of coded signals (the "chirps"). The chirps are received and decoded by the receivers. The receivers then send the decoded chirp data and information regarding the Doppler shift of the ultrasonic carrier wave to the controller.

The controller uses the data from the receivers to determine the position and velocity of the transponder. That data and the time required to move the light or lights tracking the transponder are used to calculate a prediction of the transponder's position after sufficient time has elapsed for the tracking light or lights to move. The controller then calculates the pan and tilt angles required to aim the tracking light or lights at the predicted transponder position. The pan and tilt data is combined with data from a light control console, which are together then used to control the tracking lights.

In a preferred embodiment, the system can track four transponders and control twenty-four lights.

BRIEF DESCRIPTION OF THE DRAWINGS

An embodiment of the invention will be described, by way of example only, with reference to the accompanying drawings, in which:

FIG. 7 is a flow diagram which illustrates the operation of the UART interface software module;

FIG. 8 is a flow diagram which illustrates the operation of the user control software module;

DETAILED DESCRIPTION OF THE INVENTION

Figure 1:
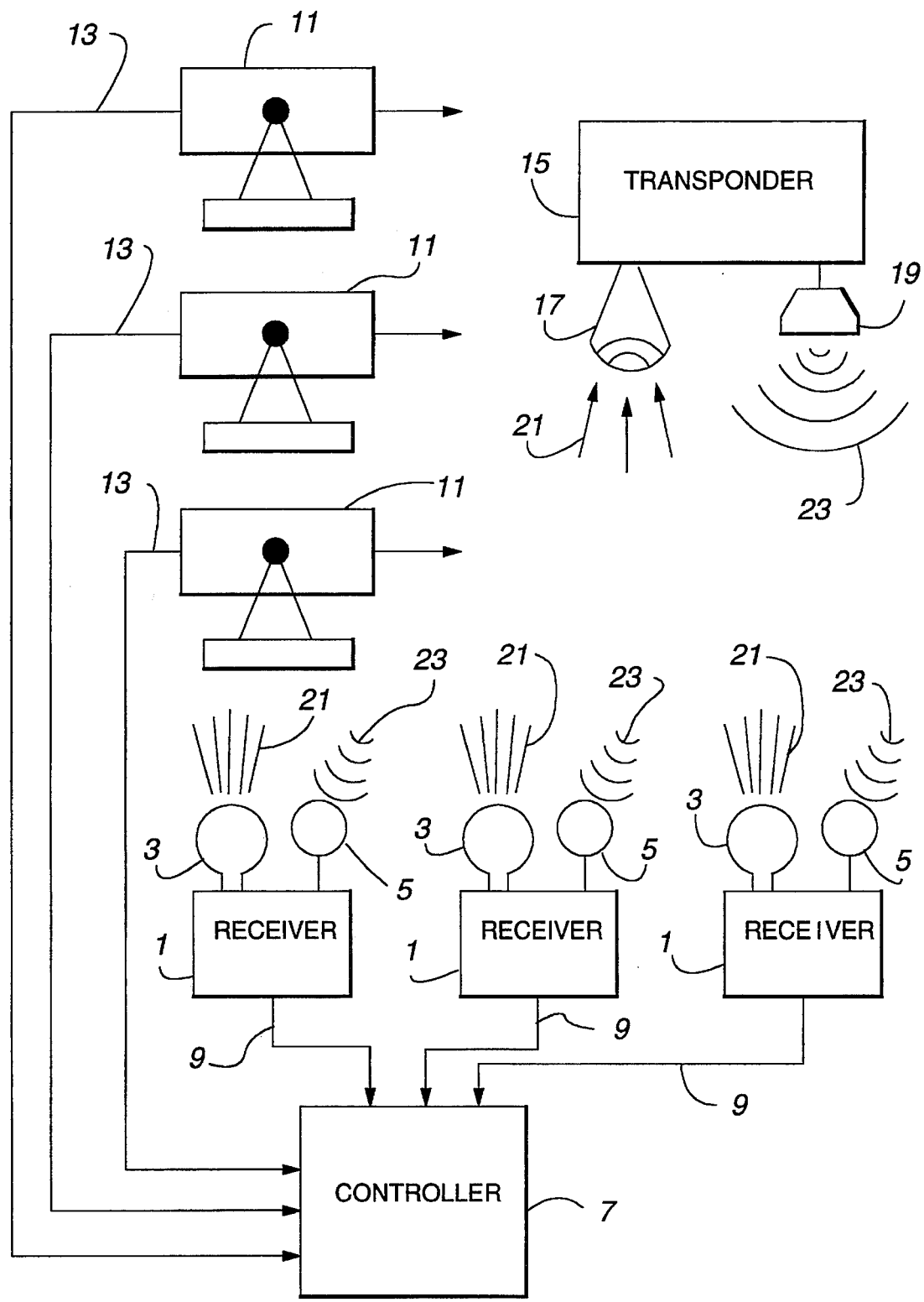
FIG. 1 is a simplified diagrammatic representation of a preferred embodiment of the invention.

FIG. 1 is a simplified diagrammatic representation of a preferred embodiment of the invention. A plurality of stationary receivers 1 are disposed above the area in which the person to be lighted (not shown), such as an actor or musician, is located; i.e., the stage. The receivers 1 each include an infrared ("IR") light source 3 and an ultrasonic microphone 5. The receivers 1 communicate with a controller 7 by means of electrical signals which are carried by a plurality of receiver cables 9 in this embodiment of the invention. One or more lights 11 are also disposed so as to play on the stage. The lights 11 are also in electrical communication with the controller 7 through a plurality of light cables 13. The person to be lighted (not shown) wears a transponder 15. The transponder 15 includes an IR receiver 17 and an ultrasonic transmitter 19.

Periodically, the controller 7 sends a signal (the "heartbeat signal") to the receivers 1. In this embodiment of the invention, the heartbeat signal is approximately 1 msec in duration and is transmitted every 100 msec. To minimize the chance of noise on the heartbeat circuit from being interpreted by the receivers as the heartbeat signal, a signal having a frequency that is different than that of the heartbeat signal is sent over the heartbeat circuit when the heartbeat signal is not being transmitted. The receivers 1 amplify the heartbeat signal and drive the IR light source 3, producing an IR heartbeat signal 21.

When the heartbeat signal is sent, a plurality of timers (not shown) within the controller 7 are started. In this embodiment of the invention, each timer is associated with three receivers 1. Alternately, a timer can be provided for each receiver 1.

When the IR sensor 17 of the transponder 15 receives the IR heartbeat signal 21 from any one of the receivers 1, the ultrasonic transmitter 19 transmits several coded bursts of ultrasonic energy 23 (the "chirps"), which are received by the ultrasonic microphones 5 of the receivers 1. The timing and coding of the chirps will be discussed in detail below.

After receiving a chirp, each receiver 1 decodes the chirp, then sends a signal indicating receipt of the chirp (the "timing signal"), the decoded chirp data, data regarding the Doppler shift of the chirp's carrier frequency, and the amplitude of the chirps through the cables 9 to the controller 7. It will be appreciated that a Doppler shift in the carrier frequency of the chirps will occur whenever the transponder 15 is moving relative to the receivers 1. The controller 7 records the times of arrival of the timing signals, the decoded chirp data, the pulse amplitude data, and the Doppler shift data, and determines the elapsed times between when the heartbeat was sent and when the timing signals were received. The controller 7 then uses the elapsed time data to calculate the distance from the transponder 15 to each of the receivers 1. The calculations are based upon the speed of sound. In addition, the controller 7 uses the Doppler shift data to determine the velocity of the transponder 15.

In calculating the distances from the transponder 15 to the receivers 1, the variation in the time it takes the heartbeat signal to travel from the controller 7 to the receivers 1 and for the IR heartbeat signals 21 to travel from the IR sources 5 to the IR sensor 17 of the transponder 19 is neglected. Similarly, any variation in the time it takes for the timing signals to travel from the receivers 1 to the controller 7 is neglected. As the heartbeat signal, the IR heartbeat signal 21, and the timing signals travel at nearly the speed of light, and the chirps travel at the speed of sound, the error introduced by neglecting the foregoing variations is substantially negligible. All such delays are lumped into a receiver correction constant, there being a correction constant for each receiver 1.

Although FIG. 1 and the other drawings show only one transponder 15, this embodiment of the invention is capable of tracking four transponders 15. Toward that end, the chirps from each transponder 15 are frequency modulated to encode data to indicate their origin; i.e., transponder number 1, transponder number 2, etc. In addition, in order to minimize the effect of echoes on the accuracy of the system, each transponder 15 transmits three chirps in response to each heartbeat signal, and each chirp contains a sequential identifier; i.e., first chirp, second chirp, or third chirp. Thus, each chirp contains coded information identifying its origin and its position in the three-chirp sequence. Finally, each chirp contains error-checking data. Such data is well-known in the art. All of the foregoing data is encoded with frequency modulation on the ultrasonic carrier with a minimum shift delay technique which is also well known in the art.

To minimize overlap of the chirps from different transponders 15, a pattern of predetermined delays between receipt of the IR heartbeat signal 21 and transmission of a chirp 23 is programmed into each transponder 15. For example, following receipt of an IR heartbeat signal 21, transponder number 1 may transmit its three chirps at 10, 40, and 80 msec. Transponder number 2 may transmit its three chirps at 5, 20, and 50 msec. The transponder delay patterns are stored in the controller's memory and are subtracted from the elapsed time data during the controller's distance calculations. In addition, the receiver correction constants are subtracted from the corresponding elapsed times during the distance calculations.

After calculating the distance from the transponder 15 to each receiver 1, the controller 7 uses the calculated distances to calculate the position of the transponder 15. The position calculation involves the use of a nonlinear Kalman filter, which is described below.

After calculating the position of the transponder 15, the controller 7 calculates the tilt and pan parameters necessary to direct the light beam from one or more spotlights 11 to, the predicted location of the transponder 15, and transmits those parameters to the light or lights 11 thereby causing the light or lights 11 to be aimed at the person or object to which the transponder 15 is attached. The predicted location of the transponder 15 is calculated using the calculated position and velocity of the transponder 15 and the time required to position the light or lights 11. As three chirps 23 from each transponder 15 are received by the receivers 1 and processed by the controller 7 every 100 msec, the light or lights 11 smoothly track the person or object to which the transponder is attached as that person or object moves about the stage.

FIG. 1 shows three receivers 1, the minimum number required to locate the transponder 15 in three-dimensional space. In this embodiment of the invention, the output power of the ultrasonic transmitter 19 in the transponder 15 is limited. As a result, the transponder 15 must be within 45 feet of three receivers 1 to obtain an accurate position of the transponder 15. Therefore, in order to provide accurate transponder position data for stages that do not fit within a triangle having sides of about forty feet, it is necessary to use more than three receivers 1, the receivers 1 being positioned so that every point on the stage is within forty-five feet of at least three receivers 1.

While this embodiment of the invention includes cables 9, 13 connecting the controller 7 to the receivers 1 and to the lights 11, it is to be understood that any communications link capable of carrying digital data may be used. Similarly, while IR light is used to communicate the heartbeat signal from the receivers 1 to the transponder 15, virtually any electromagnetic signal could be used, e.g., ultraviolet light or radio frequency energy.

Figure 2:
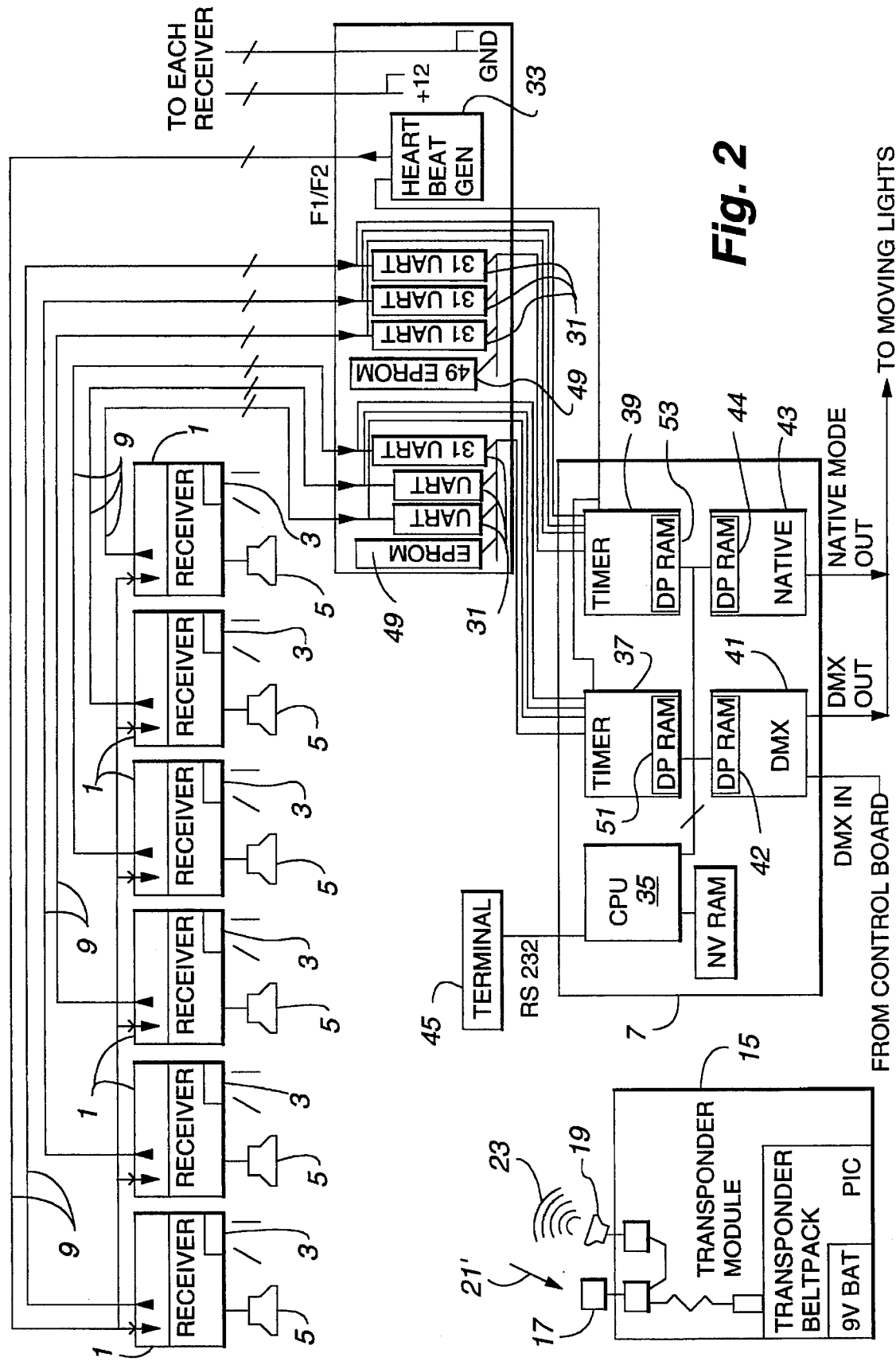
FIG. 2 is a schematic diagram of the hardware used in the embodiment of FIG. 1.

FIG. 2 is a schematic diagram showing the hardware used in the embodiment of FIG. 1. The embodiment illustrated includes six receivers 1. Each receiver 1 includes a heartbeat amplifier (not shown), an IR light source 3, an ultrasonic microphone 5, a carrier zero crossing detector (not shown), a log amplifier/detector (not shown), a leading edge detector (not shown), an analog-to-digital ("A/D") converter (not shown), and two microprocessors (not shown). The heartbeat signal is amplified, then transmitted to the transponder 15 by the IR light source 3. The ultrasonic signal from the transponder 15, which has a carrier frequency of about 40 kHz, is received by the ultrasonic microphone 5 and amplified by a high gain amplifier (not shown). The microphone input circuit has a 10 kHz bandwidth. The positive and negative going zero crossings of the amplified signal are detected and sent as interrupts to the first microprocessor. The amplified signal is also amplitude detected by the log amplifier/detector, which produces an output signal that is proportional to the logarithm of the magnitude of the ultrasonic signal. That output signal is measured and converted to digital form by the A/D converter and sent to the first microprocessor.

The log-detected signal is also monitored by the leading edge detector to determine when the signal magnitude increases by about 10 dB in a 100 microsecond period. This is accomplished by comparing the current signal with a signal that has been delayed 100 microseconds. The leading edge signal is also sent to the first microprocessor.

The first microprocessor measures and demodulates the incoming chirps and sends the results to the second microprocessor at high speed. The second microprocessor buffers the signals and transmits them to the controller 7 at communication rates. The software in the first microprocessor in each receiver 1 determines whether the magnitude of an incoming signal has reached a minimum threshold level by polling the A/D converter output signal. When the incoming signal reaches the threshold level, the software counts zero crossings and measures the time periods between the zero crossings. This forms the basis for detection of the first bit of the signal.

When the leading edge detector output becomes active, the software begins to count off five additional bit periods of twenty-one half cycles of the carrier wave. During each bit period, the software measures 10 half cycle periods. These periods are summed for each bit, the three lowest sums are interpreted as one bits, and the three highest sums are interpreted as zero bits.

All valid chirp Codes are composed of three one bits and three zero bits. The total time for all six bits, or 126 half cycles, is then measured to determine Doppler shift. It will be appreciated that because the number of zero and one bits are equal, the modulation due to a particular bit pattern does not affect the total time for 126 half cycles and, therefore, that time is a measure of the carrier frequency. The carrier frequency is crystal controlled at the transponder 15; therefore, Doppler shift can be determined by comparing the measured frequency with the known crystal frequency.

The software which controls the second microprocessor is an implementation of the sending side of a universal asynchronous receiver-transmitter ("UART"). The design of UARTs is well known in the art.

The controller 7 includes six UARTs 31, one for each receiver 1, which allow communication between the receivers 1 and the controller 7. The controller 7 also includes a heartbeat generator 33, five microprocessors 35–43, and is connected to an operator terminal 45.

A main microprocessor 35 (the "CPU") provides overall control of the system. In this embodiment, CPU 35 is a Texas Instruments MXC31. As used herein, the term "CPU" includes the central processing unit chip and the RAM, etc. associated with that chip.

The CPU 35 is connected to two timer microprocessors 37, 39, a DMX light Control board microprocessor 41, and a native mode output microprocessor 43 by a main bus 47. In accordance with a program (the "software") stored in the CPU 35, the CPU 35 accepts data from the terminal 45 (the "setup data"), the DMX microprocessor 41, and the two timer microprocessors 37, 39.

Using setup data related to the position of the receivers 1 and data from the timer microprocessors 37, 39 related to the time it takes a chirp to travel from the transponder 15 to each of the receivers 1, the CPU 35 calculates the position of the transponder 15. The transponder position data is then used to calculate the pan and tilt required to point one or more spotlights 11 (FIG. 1). The pan and tilt data is then transferred to the DMX microprocessor 41 or the native mode microprocessor 43, which in turn sends the data to the light or lights 11.

In this embodiment of the invention, the native mode microprocessor 43 and the DMX microprocessor 41 are Intel 80C32 microprocessors, each of which includes a built-in UART (not shown). Two microprocessors are provided to enable the system to control both lights by means of DMX, a standard light-control protocol, and by means of the lights' "native mode" i e a protocol which is peculiar to a particular make or model of light. During operation of the system, light control data is entered into the DMX microprocessor 41 from a standard light control board (not shown). Light control data may include light color, iris size, focus, beam shape, shutter, intensity, shape-color sequence, and the rate at which all of the foregoing change. The light control data for a particular light is combined with the calculated pan and tilt data and communicated to that light via either the DMX or native mode microprocessor's UART, as appropriate. The DMX microprocessor 41 and the native mode microprocessor 43 each have an associated dual port random access memory 42, 44.

The heartbeat generator 33 provides the heartbeat signal to the receivers 1 and, simultaneously, a signal to the two timer microprocessors 37, 39. In this embodiment of the invention, the two timer microprocessors 37, 39 are Motorola 68HC11 microprocessors. The operation of each timer microprocessor 37, 39 is controlled by a program that is stored in an associated erasable programmable read only memory ("EPROM") 49. The timer microprocessors 37, 39 function to determine the elapsed time between the transmission of the heartbeat signal by the heartbeat generator 33 and the receipt of the timing signals from the respective receivers 1. The elapsed time data is stored in two dual port random access memories (the "timer DP RAMs") 51, 53, one for each timer microprocessor. The elapsed time data stored in the timer microprocessor DP RAMS 51, 53 is transferred to the CPU 35, where it is used in the calculations described above in connection with FIG. 1.

During system setup, the operator may enter the following data into the CPU's memory by means of a hand-held, 48-key terminal 45 having alphanumeric capability and an 8-line, 48-character, light emitting diode display:

1. the location of each receiver 1;
2. the type (the manufacturer and model number) of each light 11 (FIG. 1);
3. the mode of communication to be used for each light 11 (either DMX, an industry standard language, or the light's native language);
4. the position of each light, i.e., each light's XYZ position relative to the stage;
5. the orientation of each light, i.e., the orientation of each light's zero axis relative to its XYZ position, the rotation of the light about its zero axis, and the angle between the light's mirror and its zero axis;
6. a correction constant data for each receiver 1; and
7. the temperature and humidity. Some of this data may be entered automatically by the system itself. After entry of the setup data, the system is ready for use.

Figure 3:
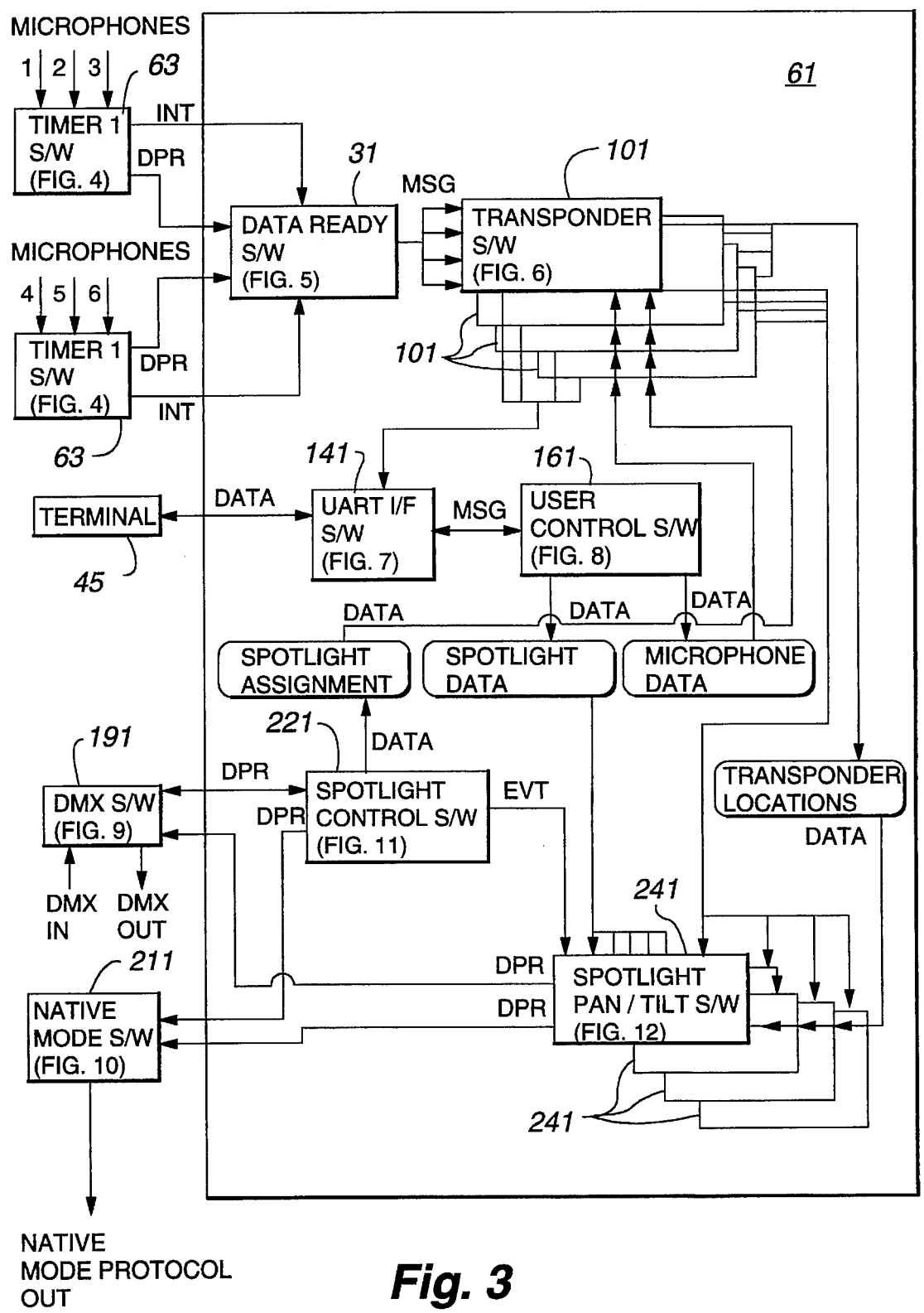
FIG. 3 is a block diagram which illustrates the overall relationship between the software modules which control the embodiment of FIG. 1.

FIG. 3 is a block diagram which illustrates the overall relationship between the various software modules which make up the system software and the flow of data and timing information between the software modules. All the software modules shown in the solid box 61 of FIG. 3 are contained by the CPU 35 (FIG. 2).

The software modules are shown in greater detail in subsequent figures.

Upon receiving a chirp, a receiver 1 (FIGS. 1 & 2) transmits a signal which comprises three sequences, each comprising a start bit, an 9-bit data byte, and a stop bit. The data bytes contain the transponder number, the chirp number, Doppler shift information, information related to the amplitude of the chirp, and encoding data. The software modules 63 for the two timer microprocessors 37, 39 (FIG. 2) are identical.

Figure 4:
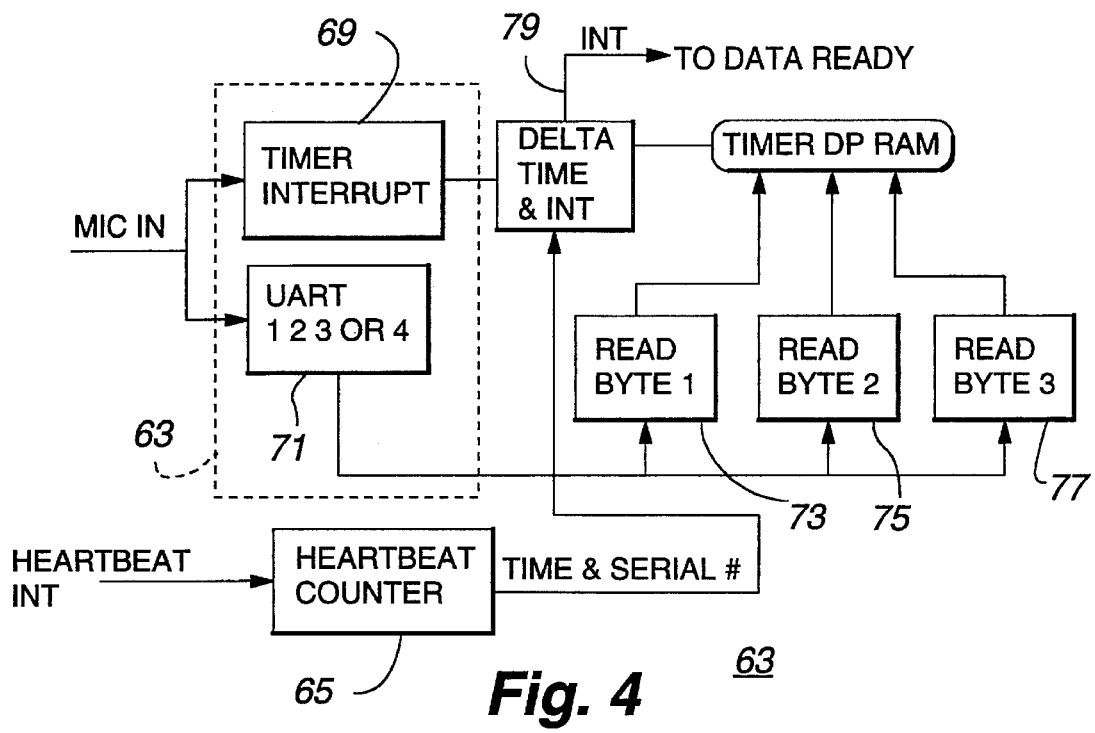
FIG. 4 is a flow diagram which illustrates the operation of the timer software modules.

Referring to FIG. 4, when the heartbeat generator 33 (FIG. 2) generates a heartbeat, it also sends a heartbeat interrupt to the timer microprocessors 63. In each timer microprocessor 63, heartbeat counter software 65 notes the time of arrival of the heartbeat interrupt signal, assigns a serial number to the heartbeat, and stores the arrival time and serial number in the timer microprocessor's memory.

As mentioned previously, each timer microprocessor 37, 39 is associated with three receivers 1. Each timer microprocessor 37, 39 includes three parallel channels for receiving and storing data. That is, each timer microprocessor 37, 39 can receive data from all three associated receivers 1 simultaneously. Thus, the software indicated within the dashed box 67 in FIG. 4 is repeated three times in each timer microprocessor 37, 39.

Upon receipt of a signal from the receiver 1, the associated timer interrupt software 69 stores the time of arrival of the first start bit of the signal and the associated UART software 71 receives and buffers the signal's data bytes. As indicated by blocks 73–77, the three data bytes are read as they arrive and stored in the associated DP RAM 51, 53. At block 79, the previously-stored heartbeat arrival time is subtracted from the start bit arrival time and the resulting elapsed time and the serial number of the heartbeat used to derive it are stored in the associated DP RAM 51, 53. In addition, an interrupt signal is generated. As can be seen in FIG. 3, the two timer software modules 63 each provide an interrupt signal and data to a data ready software module 81.

Figure 5:
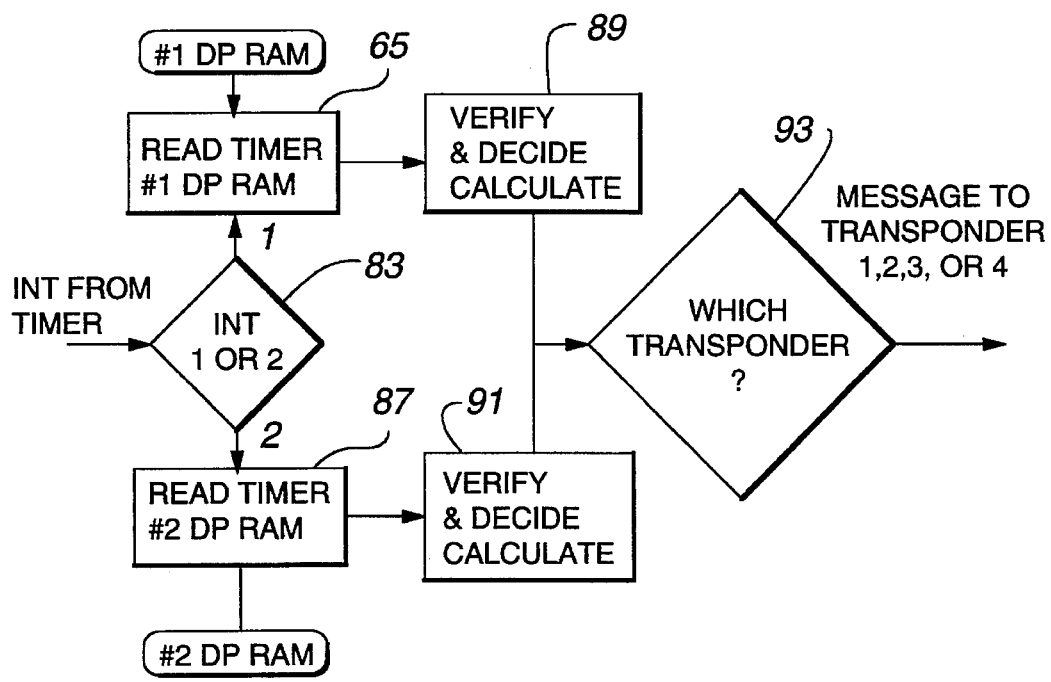
FIG. 5 is a flow diagram which illustrates the operation of the data ready software module.

Referring now to FIG. 5, at block 83, the data ready software module determines which timer microprocessor 37, 39 (FIG. 2) is currently generating an interrupt signal. At block 85 or 87, as appropriate, the data for one chirp from one receiver 1 is read. At block 85 or 91, as appropriate, the data is verified and decoded, the distance from the transponder 15 to the receiver 1 is calculated, and the velocity of the transponder 15 is calculated. Verification includes checking that the chirp's amplitude was above a minimum acceptable value and correlating the elapsed time with the heartbeat serial number to verify that the elapsed time is reasonable.

To calculate the distance from the transponder 15 to the receiver 1, the receiver correction constant and the predetermined transponder delay discussed above are subtracted from the elapsed time and the result is divided into the local speed of sound. The latter value was previously calculated using the temperature and humidity that was entered during setup. The velocity of the transponder 15 is calculated using the Doppler shift data.

At block 93, the software determines which transponder 15 generated the chirp and sends the chirp data to a corresponding transponder software module 101 as a message comprised of the following data in a specific order: the distance from the transponder 15 to the receiver 1, the velocity of the transponder 15, the chirp number, and the heartbeat serial number. As can be seen in FIG. 3, the message from the data ready software module 81 is queued for a corresponding transponder software module 101.

Figure 6:
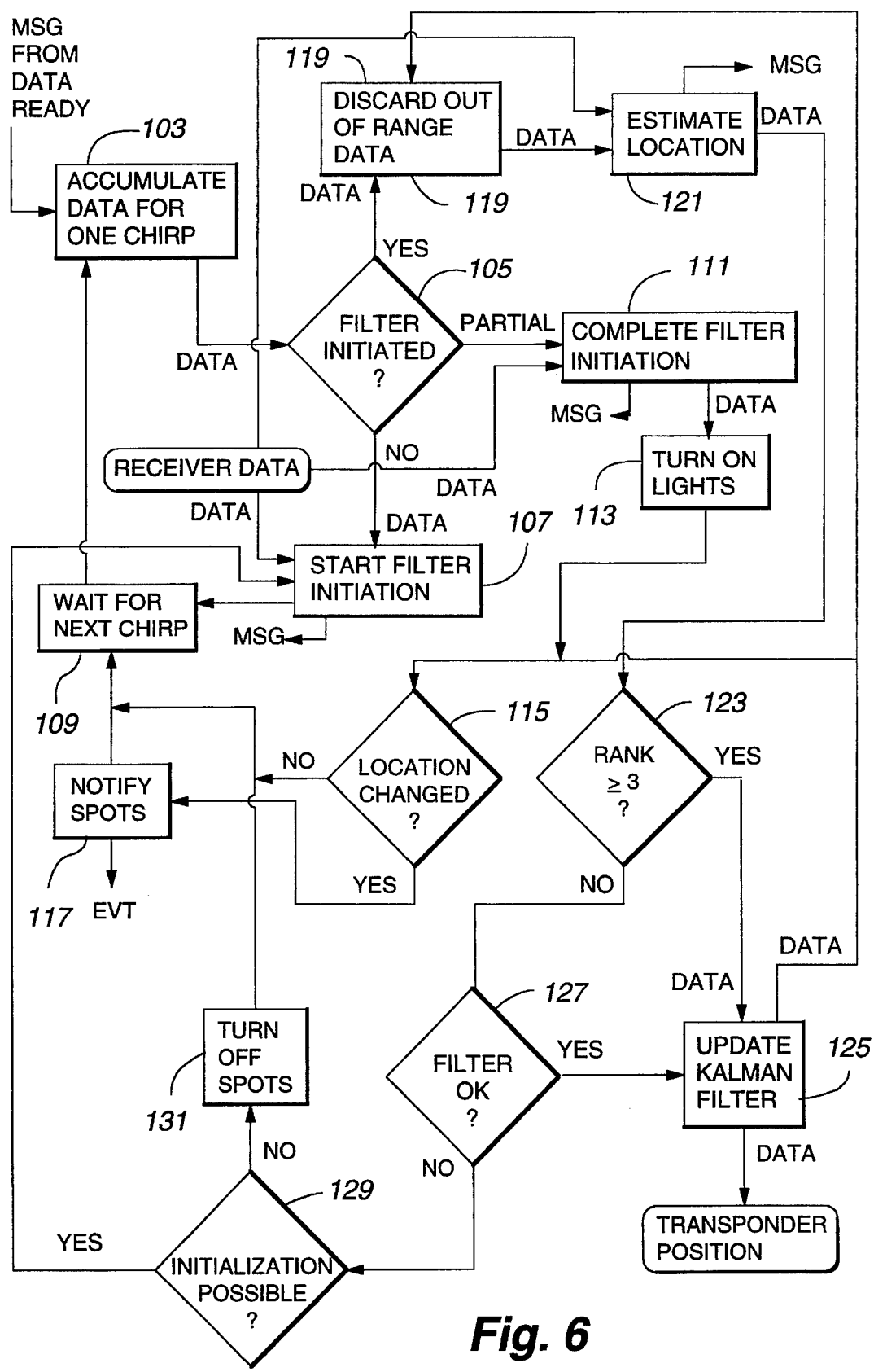
FIG. 6 is a flow diagram which illustrates the operation of the transponder software modules.

FIG. 6 shows one of the transponder software modules 101. The modules 101 are identical for all transponders 15. To avoid cluttering the figures, multiple identical modules such as the transponder software modules 101, are shown as mirrored images in FIG. 3.

The normal mode of operation of the transponder software module 101 makes use of a nonlinear Kalman filter to minimize the effects of noise. A Kalman filter is a complex recursive digital filter which uses time series data to predict a signal, then compares the received signal with the prediction, and then corrects the prediction in accordance with the level of noise present in the system. Such filters are well known in the digital art, and will not be discussed herein.

At block 103, messages from the data ready software module 81 are accumulated until enough time has elapsed for the data for a single chirp from all six receivers 1 to arrive. At block 105, the software determines whether the Kalman filter has been initialized. Initialization of the Kalman filter requires a minimum of two calculated transponder positions. If the filter has not been initialized, the software proceeds to block 107, where the position of the transponder 15 is calculated by solving for the apex of a tetrahedron using distance data from three receivers 1 for the sides of the tetrahedron and receiver position data that was entered during setup for the base. The calculated position is then stored in memory. The mathematical equations used to solve the tetrahedron are well known and will not be discussed herein. The software then proceeds to block 109, where it waits until sufficient time has elapsed for data to be accumulated from the next chirp.

At block 105, if the Kalman filter is partially initialized, that is, if the process described in the previous paragraph has been accomplished, the software proceeds to block 111. At block 111, the transponder position is again calculated by solving a tetrahedron. Also, the velocity of the transponder 15 is calculated using the two transponder positions.

At block 113, following the second transponder position calculation, the light or lights are turned on. Due to the time it takes for the lights to illuminate, the software will have time to transmit pan and tilt information to the lights before the lights are illuminated.

At block 115, the calculated transponder position is compared with the position that was previously sent to the light to determine if the transponder position has changed. If not, the software proceeds to block 109 to await the next chirp. If so, the software proceeds to block 117, where an event signal is generated. As can be seen in FIG. 3, that event signal is sent to the spotlight pan/tilt software module or modules 241 for the spotlight or spotlights 11 tracking the transponder 15 in question.

Returning to FIG. 6, at block 105, when the Kalman filter has been initialized, the software proceeds to block 119 where the distance data is compared with that which is possible in view of the last calculated transponder position, and out of range data is discarded. This step helps to minimize the effect of echoes on the system.

At block 121, a new transponder position is calculated using a least squares estimate. The software also calculates a least squares estimate rank, which is an estimate of the useability of the calculated position based on which transponder-receiver distance data was used in the position calculation. With the transponder in certain positions, the effective number of receivers' data is less than the actual number of receivers' data used in the position calculation. The least squares estimate rank reflects that fact. Both the least squares estimate and the least squares estimate rank are well known mathematical techniques.

At block 123, the software determines whether the least squares estimate rank calculated at block 121 is equivalent to at least three receivers 1. If so, the software proceeds to block 125, where the filter is updated with the new transponder position and the data is stored in memory. AS can be seen in FIG. 3, the transponder position data is an input to the appropriate spotlight pan/tilt software module 201.

If the least squares estimate rank is equivalent to less than three receivers, the software proceeds to block 127, where it determines whether the filter condition is satisfactory. That determination is based upon whether the number of recently used chirps for which the least squares estimate rank is two or less exceed a predetermined value. If the predetermined value is not exceeded, the software proceeds to block 125. If not, the software proceeds to block 129.

At block 129, the software determines whether data from at least three receivers was used in the position calculation at block 121. If so, initialization of the filter is possible, and the software proceeds to block 107. If not, the software proceeds to block 131, where the lights are turned off. After block 131, the software proceeds to block 109, where it waits for sufficient time to elapse for the data for a single chirp from all six receivers to be accumulated.

In addition to the actions described above in relation to initializing or updating the Kalman filter, at blocks 107, 111, and 121, the software generates a message indicating the status of the filter. As can be seen in FIG. 3, that message is an input to a UART interface software module 141.

As can be seen in FIG. 3, the inputs to the UART interface software module 141 are a sequence of messages from the transponder software module 101 and a user control software module 161 and alphanumeric characters from the hand-held terminal 14.

Referring now to FIG. 7, at block 143, the data contained in messages from the transponder software modules 101 are queued for a UART included in the CPU 35. Alphanumeric characters entered on the terminal 45 are also queued for the UART. At Block 145, the UART sends the message data or alphanumeric characters to the terminal 45 for display.

When the operator is entering data on the terminal 45 (FIG. 3), an interrupt signal is generated each time a character is entered. At block 147, the software determines whether the interrupt signal is present. If so, the software proceeds to block 149, where character data is accumulated until a character that indicates the end of the message is received, at which time the accumulated data is sent to block 151, where the accumulated character data is converted to a message and queued for a user control software module 161. As will be discussed below, the user control software module 161 provides prompts for the operator as messages that are queued for the UART interface software module 141. After sending a message to the user control software module 161 at block 151, the software proceeds to block 153, where it awaits the arrival of the next message or terminal entry response to the prompt message. At block 153, if a message is not present, the software proceeds to block 143.

Referring now to FIG. 8, the user control software module 161 allows the operator to enter data into the system and initiate operation of the system. At block 163, upon applying power to the system, the CPU's operating system initializes the system. The software then proceeds to block 165, where a prompt message is queued for the UART interface software module 141 for display on the terminal 45. At block 167, the software awaits a response from the operator. At Block 169, the user's response is sent to the UART interface software module 161 for display on the terminal 45.

At block 171, the software proceeds to the action selected by the operator. If the operator selects "system setup" the software proceeds to block 173, where the software issues a prompt message. At block 175, the software awaits a response from the operator. When a response is received, the software proceeds to block 177, where it sends a message to display the operator's response on the terminal 45. At block 179, the data is stored in the CPU's memory. At block 181, the software determines whether additional prompts require answers. If so, the software proceeds to block 173, where the next prompt is issued. If not, the software proceeds to block 165.

If the operator selects "operate system" at block 171, the system commences normal operation at block 183. At block 185, the software determines whether the operator has sent a "stop system" message. If not, the system continues operating. If so, the system proceeds to block 165.

Figure 9:
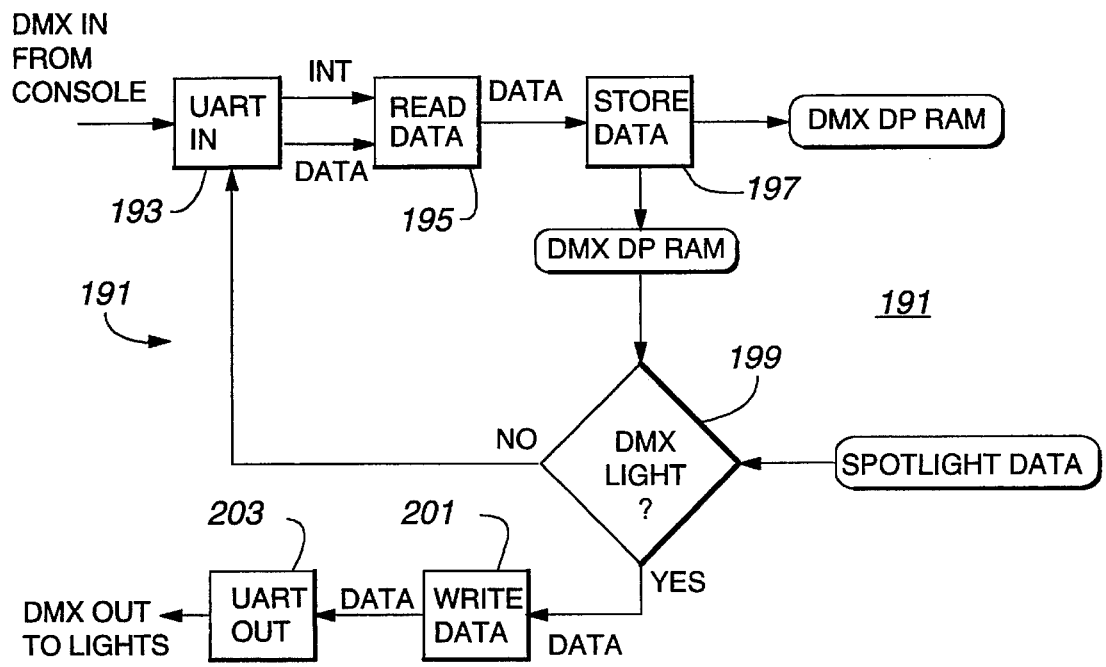
FIG. 9 is a flow diagram which illustrates the operation of the DMX software module.

Referring now to FIG. 9, at blocks 193 and 195, the DMX software module 191 inputs DMX protocol data from the light control console (the "DMX IN data"). At block 197, the software stores the data in the DMX DP RAM 42 (FIG. 2). At block 199, the software determines if the light which the control console data applies is a light that is to be controlled using DMX protocol data. If so, at blocks 201 and 203 the software sends the data to the subject light 11.

It is to be understood that light control console data for lights that are to be controlled with native mode protocol is in the DMX protocol format. As will be discussed below, the data for native mode lights is translated in the light control software module 221.

Figure 10:
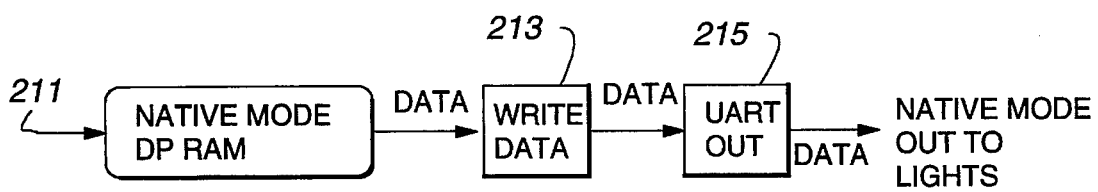
FIG. 10 is a flow diagram which illustrates the operation of the native mode software module.

Referring now to FIG. 10, at blocks 213 and 215, the native mode software module 211 retrieves native mode light control data from the native mode microprocessor DP RAM 44 (FIG. 2) and sends it to the appropriate light 11.

Figure 11:
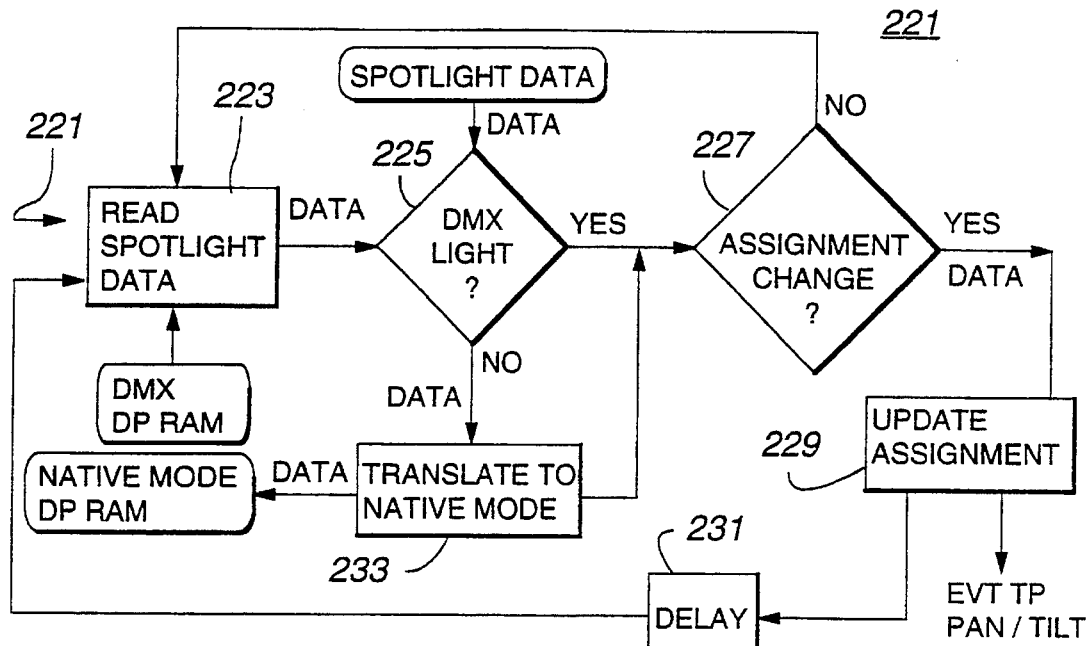
FIG. 11 is a flow diagram which illustrates the operation of the spotlight control software module.

Referring now to FIG. 11, at block 223, the spotlight control software module 221 inputs DMX IN data from the DMX microprocessor DP RAM 42 (FIG. 2). At block 225, the software determines whether the subject light is to be controlled using DMX protocol. If so, at block 227, the software determines whether the spotlight's assignment has changed. If not, the software returns to block 223. If so, at block 229 the software updates the spotlight assignment and generates an event signal, which is sent to the spotlight pan/tilt software module 241 (FIG. 3). Then, at block 231, the software delays to allow the time required to effect the assignment change, then returns to block 223.

At block 225, if the DMX IN data is for a light that is to be controlled using a native mode protocol, the software proceeds 25 to block 233, where the data is translated to the appropriate native mode protocol and saved in the native mode microprocessor DP RAM 44 (FIG. 2). At block 227, the software determines whether a spotlight assignment change has occurred. If so, the software proceeds to block 229. If not, the software returns to block 223.

Figure 12:
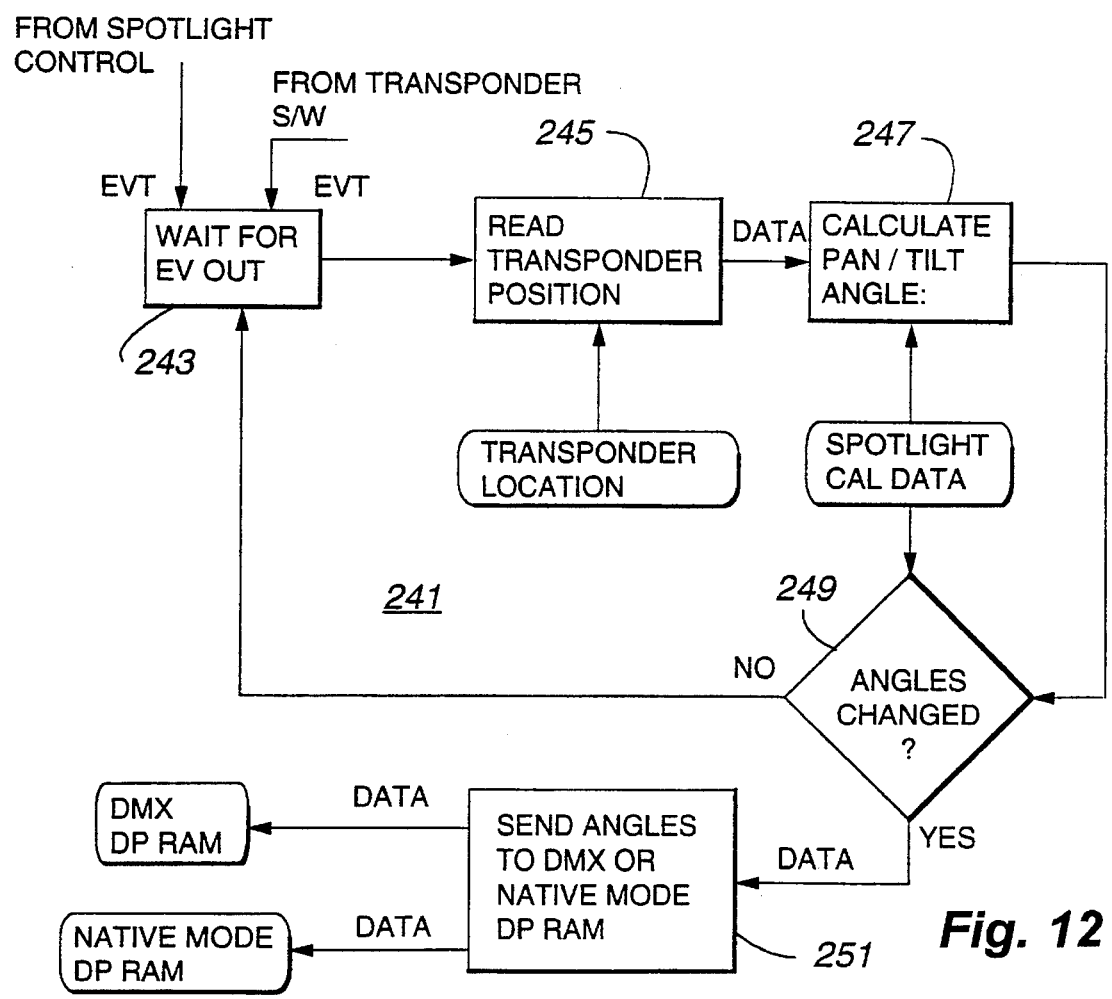
FIG. 12 is a flow diagram which illustrates the operation of the spotlight pan/tilt software module.

FIG. 12 is a flow diagram of a spotlight pan/tilt software module 241. This embodiment of the invention is intended to control 24 spotlights; thus, there are twenty-four identical spotlight pan/tilt software modules 241.

At block 243 in FIG. 12, the spotlight pan/tilt software module 241 begins operation when it receives (1) an event signal indicating a spotlight assignment change from the spotlight control software module 221 (FIGS. 3 and 11) or (2) an event signal from a transponder software module 191 (FIGS. 3 and 6) indicating that the transponder position has changed. At blocks 245 and 247, the software inputs transponder position data from the appropriate transponder software module 101, then calculates the pan and tilt angles required to aim the appropriate spotlight at the predicted position of that transponder 15. That calculation is based on the calculated position of the transponder and the calculated velocity of the transponder. At block 249, the software compares the calculated pan and tilt angles with the current angles to determine if the angles have changed. If so, at block 251 the software sends the new pan and tilt angle data the appropriate DP RAM. If the spotlight in question is controlled using the DMX protocol, the pan/tilt data is sent to the DMX microprocessor DP RAM 42. If the spotlight in question is controlled using a native mode protocol, the pan/tilt data is sent to the native mode microprocessor DP Ram 44.

It is to be understood that the present invention is not limited to the described embodiment. For example, the described embodiment could easily be adapted to track moving persons or objects with television or motion picture cameras.

While the preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. A system for tracking a moving person or object comprising:

a transponder, a plurality of receivers, a controller, a communications link between said receivers and said controller, a moveable tracking device for tracking a person or object, and a communications link between said controller and said tracking device;

said receivers including a transmitter for transmitting an electromagnetic signal and a receiver for receiving an ultrasonic signal;

said transponder being adapted to be attached to a person or object to be tracked and including a sensor for receiving said electromagnetic signal and an ultrasonic transmitter for transmitting an ultrasonic signal in response to the receipt of said electromagnetic signal;

said receivers, controller, and the communications link therebetween acting to calculate the position of said person or object; and said controller acting to generate a signal for controlling said tracking device to point said device at said transponder, which signal is communicated to said tracking device by said communications link.

2. A performer tracking system for tracking movements of at least one performer upon a stage, said system comprising:

a plurality of signal transmitters for generating electromagnetic, transmit signals;

at least one transponder carried by the at least one performer upon the stage, said at least one transponder for receiving the transmit signals generated by said plurality of signal transmitters and for generating sound signals responsive to reception of the transmit signals;

a plurality of sound signal receivers positioned together with said signal transmitters, said sound signal receivers for receiving the sound signals generated by said at least one transponder;

a controller coupled to said signal transmitters and to said sound signal receivers, said controller for determining positions of the at the least transponder carried by the performer and for generating tracking control signals responsive thereto; and at least one tracking device coupled to receive the tracking control signals generated by said controller, said tracking device for tracking the movements of the at least one performer responsive to the positions of the transponder determined by said controller.

3. The performer tracking system of claim 2 wherein said signal transmitters comprise infrared transmitters and the transmit signals comprise infrared signals.

4. The performer tracking system of claim 3 wherein said at least one transponder comprises an infrared signal sensor.

5. The performer tracking system of claim 2 wherein said at least one transponder comprises an ultrasonic transmitter and the sound signals comprise ultrasonic signals.

6. The performer tracking system of claim 5 wherein said sound signal receivers comprise ultrasonic microphones.

7. The performer tracking system of claim 2 wherein the sound signals comprise coded signals.

8. The performer tracking system of claim 7 wherein the coded signals forming the sound signals are of values identifying the at least one transponder generating the sound signals.

9. The performer tracking system of claim 8 wherein the coded signals comprise frequency modulated signals including at least portions thereof of values of sequential identifiers for identifying the at least one transponder generating the sound signals.

10. The performer tracking system of claim 2 wherein the movements of a plurality of performers are tracked and wherein said at least one transponder comprises a plurality of transponders, each associated with a performer.

11. The performer tracking system of claim 2 wherein said at least one tracking device comprises a spotlight.

12. The performer tracking system of claim 11 wherein the tracking control signals generated by said controller are of values of selected pan and tilt parameters.

13. The performer tracking system of claim 12 wherein said tracking control signals are further of values of selected light control data.

14. The performer tracking system of claim 2 wherein the transmit signals comprise periodic signals.

15. The performer tracking system of claim 2 wherein said controller determines distances between said signal transmitters and said at least one transponder and, responsive to said distances, determines the position of the at least one transponder and, hence, of the performer carrying the at least one transponder.

16. The performer tracking system of claim 15 wherein the sound signals generated by said at least one transponder are of selected frequencies and said controller further determines variances of received frequencies of the sound signals received by said sound signal receivers with the selected frequencies.

17. The performer tracking system of claim 15 wherein said controller further determines Doppler shifts of the sound signals generated by said at least one transponder.

18. A method for tracking movements of at least one at least one performer upon a stage, each performer carrying a transponder therewith, said method comprising the steps of:
    transmitting a plurality of electromagnetic, transmit signals to the transponder from a plurality of transmitters;
    generating, by the transponder, sound signals responsive to reception by the transponder of the transmit signals;
    receiving the sound signals generated by the transponder by a plurality of receivers;
    determining positions of the transponder and, hence, the performer carrying the transponder responsive to times at which the transmit signals are transmitted and the sound signals are received; and
    tracking the movements of the at least one performer with a spotlight responsive to the positions of the transponder determined during said step of determining.

19. A performer tracking system for tracking movements of a plurality of performers upon a stage, said system comprising:
    a plurality of infrared transmitters positioned about the stage, said infrared transmitters for generating infrared signals;
    a transponder carried by each of the performers upon the stage, said transponders for receiving the infrared signals generated by said infrared transmitters and for generating ultrasonic signals responsive to reception of the infrared signals;
    a plurality of ultrasonic microphones positioned together with the infrared transmitters, said ultrasonic microphones for receiving the ultrasonic signals generated by said transponders;
    a controller coupled to said infrared transmitters and to said ultrasonic microphones, said controller for determining positions of the transponders carried by the performers and for generating tracking control signals responsive thereto; and
    spotlight assemblies coupled to receive the tracking control signals, said spotlight assemblies for tracking the movements of the performers responsive to the positions of the transponders determined by said controller.

20. The performer tracking system of claim 19 wherein the ultrasonic signals form frequency-modulated, coded signals of values including values of sequential identifiers for identifying said transponders generating the ultrasonic signals, said transponders carried by the performers each generating uniquely coded signals.

21. A performer tracking system for tracking movements of at least one performer upon a stage, said system comprising:
    a plurality of fixedly-positioned signal transmitters for transmitting transmit signals towards the at least one performer upon the stage;
    at least one transponder carried by the at least one performer, said at least one transponder for receiving the transmit signals generated by said plurality of fixedly-positioned signal transmitters and for generating response signals responsive to reception of the transmit signals;
    a signal receiver for receiving the return signals generated by said at least one transponder;
    a controller coupled to said signal receiver, said controller for determining positions of the at least one transponder carried by the at least one performer and for generating tracking control signals responsive to the positions of the at least one transponder; and
    at least one tracking device coupled to receive the tracking control signals generated by said controller, said tracking device for tracking the movements of the at least one performer responsive to the positions of the at least one transponder determined by said controller.

22. The performer tracking system of claim 21 wherein at least either the transmit signals generated by said plurality of fixedly-positioned signal transmitters or said response signals transmitted by said at least one transponder comprise ultrasonic sound signals.

23. The performer tracking system of claim 22 wherein said controller determines the positions of said at least one transponder carried by the at least one performer responsive to transmission times of said ultrasonic sound signals.

24. The performer tracking system of claim 22 wherein said ultrasonic sound signals are of selected frequencies and said controller further determines variances of received frequencies of the ultrasonic sound signals, once transmitted and received.

25. The performer tracking system of claim 24 wherein said controller further determines Doppler shifts of the ultrasonic sound signals.

* * * * *